(12) United States Patent
Yu et al.

(10) Patent No.: US 11,943,030 B2
(45) Date of Patent: Mar. 26, 2024

(54) METHOD AND APPARATUS FOR ANTENNA PANEL CONTROL

(71) Applicant: FG Innovation Company Limited, Tuen Mun (HK)

(72) Inventors: Chia-Hao Yu, Taipei (TW); Hsin-Hsi Tsai, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 167 days.

(21) Appl. No.: 17/602,753

(22) PCT Filed: May 6, 2020

(86) PCT No.: PCT/CN2020/088698
§ 371 (c)(1),
(2) Date: Oct. 9, 2021

(87) PCT Pub. No.: WO2020/224578
PCT Pub. Date: Nov. 12, 2020

(65) Prior Publication Data
US 2022/0166482 A1    May 26, 2022

Related U.S. Application Data

(60) Provisional application No. 62/845,820, filed on May 9, 2019.

(51) Int. Cl.
*H04B 1/04* (2006.01)
*H04B 1/18* (2006.01)
(Continued)

(52) U.S. Cl.
CPC ......... *H04B 7/0628* (2013.01); *H04B 1/0458* (2013.01); *H04B 1/18* (2013.01);
(Continued)

(58) Field of Classification Search
CPC ...... H04B 1/0458; H04B 7/0628; H04B 1/18; H04B 7/0404; H04B 7/0695; H04B 7/088
(Continued)

(56) References Cited

U.S. PATENT DOCUMENTS

2020/0067615 A1* 2/2020 Ghanbarinejad .... H04B 17/309
2020/0106168 A1* 4/2020 Hakola ................ H04B 7/0617
(Continued)

FOREIGN PATENT DOCUMENTS

CN    108476050    8/2018
CN    108811075    11/2018
(Continued)

OTHER PUBLICATIONS

Huawei, HiSilicon, Views on NR UE capabilities, 3GPP TSG RAN Meeting #80, La Jolla, USA, Jun. 11-14, 2018, RP-180873, part 2.1.

*Primary Examiner* — Emmanuel Bayard
(74) *Attorney, Agent, or Firm* — ScienBiziP, P.C.

(57) ABSTRACT

A method for wireless communication performed by a user equipment (UE) is provided. The UE includes a plurality of antenna panels. The method includes transmitting, to a Base Station (BS), a UE capability message that includes a number of the plurality of antenna panels; and transmitting, to the BS, a panel report that includes information of the plurality of antenna panels, the information associated with at least one of a Synchronization Signal Block (SSB) and a Channel State Information Reference Signal (CSI-RS).

18 Claims, 4 Drawing Sheets

(51) Int. Cl.
*H04B 7/0404* (2017.01)
*H04B 7/06* (2006.01)
*H04B 7/08* (2006.01)

(52) U.S. Cl.
CPC ......... *H04B 7/0404* (2013.01); *H04B 7/0695* (2013.01); *H04B 7/088* (2013.01)

(58) Field of Classification Search
USPC .................................................. 375/262, 267
See application file for complete search history.

(56) References Cited

U.S. PATENT DOCUMENTS

| | | | | |
|---|---|---|---|---|
| 2021/0336737 | A1* | 10/2021 | Li | H04L 5/0094 |
| 2022/0007293 | A1* | 1/2022 | Kaikkonen | H04W 52/0251 |
| 2022/0030579 | A1* | 1/2022 | Cirik | H04W 72/1268 |
| 2022/0166468 | A1* | 5/2022 | Go | H04B 7/0456 |
| 2022/0166587 | A1* | 5/2022 | Go | H04L 5/0048 |
| 2023/0299467 | A1* | 9/2023 | Hakola | H01Q 1/246 |
| | | | | 455/562.1 |

FOREIGN PATENT DOCUMENTS

| | | |
|---|---|---|
| CN | 109314945 | 2/2019 |
| CN | 109391993 | 2/2019 |
| CN | 110868231 | 3/2020 |
| WO | 2018058608 | 4/2018 |

\* cited by examiner

400

402 — Select one of the antenna panels as a fallback panel

404 — Activate the fallback panel and deactivate all the other antenna panels

500

502 — Receive, from a BS, a panel switch indication that indicates an inactive panel for transmission 504 — Transmit, to the BS, a panel state report after receiving the panel switch indication

600

METHOD AND APPARATUS FOR ANTENNA PANEL CONTROL

CROSS-REFERENCE TO RELATED APPLICATION(S)

The present disclosure claims the benefit of and priority of provisional U.S. Patent Application Ser. No. 62/845,820, filed on May 9, 2019, entitled "Mechanism for UE Panel Switch Operation" ("the '820 provisional"). The disclosure of the '820 provisional is hereby incorporated fully by reference into the present disclosure.

FIELD

The present disclosure is related to wireless communication, and more particularly, to a method for controlling antenna panels in cellular wireless communication networks.

BACKGROUND

Various efforts have been made to improve different aspects of wireless communications, such as data rate, latency, reliability and mobility, for cellular wireless communication systems (e.g., fifth generation (5G) New Radio (NR)). NR supports beam management for enabling high frequency band (e.g., millimeter wave frequency band) communication. To combat higher pathloss in the high frequency band, beamforming technique is adopted to provide additional gain, with the cost of a reduced spatial coverage for signal transmission/reception. To make up for the lost spatial coverage of beamforming, a beam is steered towards different directions in a time division multiplexing (TDM) manner so that after a certain time period, a user equipment (UE) or a base station (BS) can still learn its environment with a desired spatial coverage.

To perform beamforming, a collection of antenna elements is needed. By tuning the phase and optionally gain of a signal input to individual antenna elements, a beam with different characteristics is formed. Based on implementation, a certain collection of antenna elements may be controlled at the same time as an entity (which may also be referred to as a panel, an antenna panel, or a UE panel in the following disclosure) to form one beam. Depending on implementation, different panels may be activated at the same time to form individual beams. The UE may need multiple panels to achieve omni-directional/isotropic spatial coverage. There is a need in the industry for an improved and efficient mechanism for the UE to control panel related operations.

SUMMARY

The present disclosure is directed to a method for antenna panel control performed by a UE in cellular wireless communication networks.

In a first aspect of the present disclosure, a method for wireless communication performed by a UE is provided. The method includes transmitting, to a BS, a UE capability message that includes a number of the plurality of antenna panels; and transmitting, to the BS, a panel status report that includes information of the plurality of antenna panels, the information associated with at least one of a Synchronization Signal Block (SSB) and a Channel State Information Reference Signal (CSI-RS).

In an implementation of the first aspect, the panel status report further includes an identifier (ID) of each of the plurality of antenna panels.

In another implementation of the first aspect, the panel status report further includes an activation state of the plurality of antenna panels, the activation state indicating whether each of the plurality of antenna panels is activated or deactivated.

In another implementation of the first aspect, the panel status report is transmitted when the activation state changes.

In another implementation of the first aspect, the UE capability message further includes a maximum number of the plurality of antenna panels that can be activated.

In another implementation of the first aspect, the UE capability message includes an activation latency of the plurality of antenna panels.

In another implementation of the first aspect, the panel status report is transmitted periodically after the UE receives, from the BS, a configuration that indicates a periodic transmission of the panel status report.

In another implementation of the first aspect, the panel status report is transmitted in response to a request for the panel state report from the BS.

In another implementation of the first aspect, the panel status report is transmitted semi-persistently after the UE receives, from the BS, a configuration that indicates a semi-persistent transmission of the panel status report.

Another implementation of the first aspect further comprises activating or deactivating each of the plurality of antenna panels based on UE implementation.

In a second aspect, a UE for wireless communication is provided. The UE includes one or more processors and at least one memory coupled to at least one of the one or more processors, where the at least one memory stores a computer-executable program that, when executed by the at least one of the one or more processors, causes the UE to transmit, to a BS, a UE capability message that includes a number of the plurality of antenna panels; and transmit, to the BS, a panel status report that includes an activation state of the plurality of antenna panels, the activation state indicating whether each of the plurality of antenna panels is activated or deactivated.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
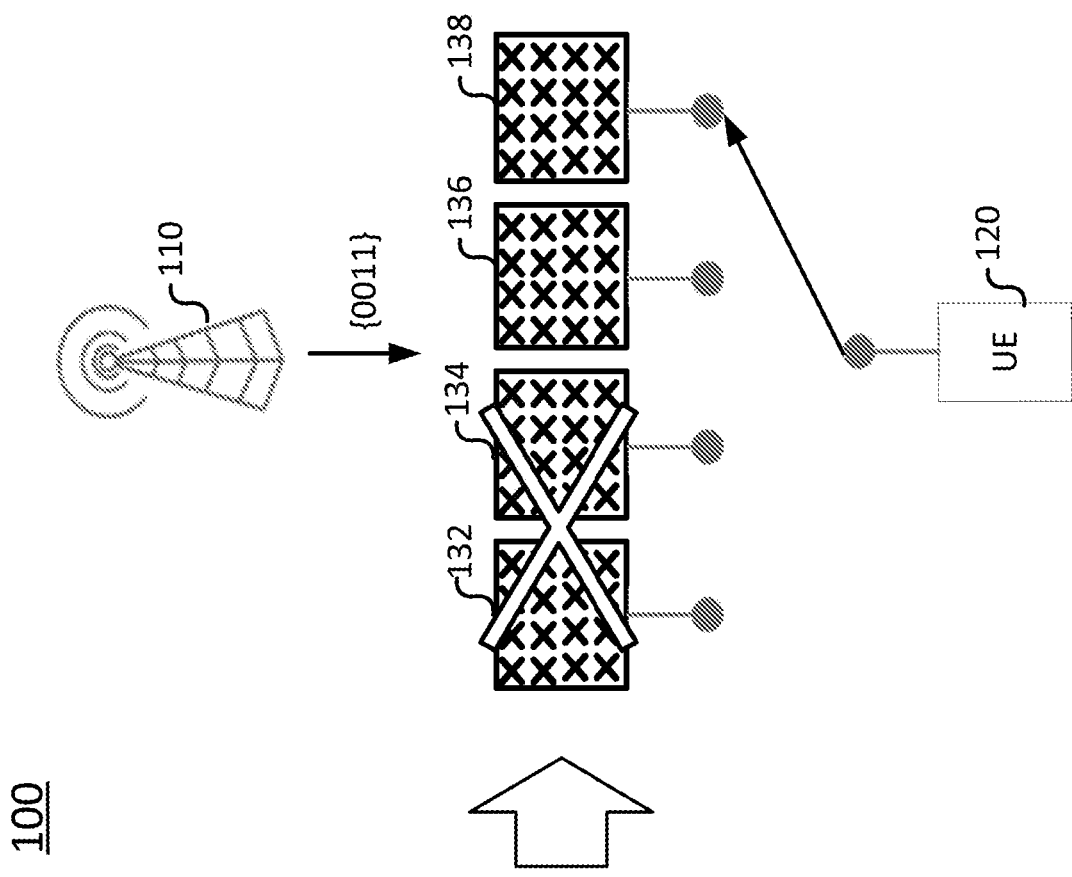
FIG. 1 includes a diagram illustrating multiple antenna panels and panel activation/deactivation according to an example implementation of the present disclosure.
Figure 1:
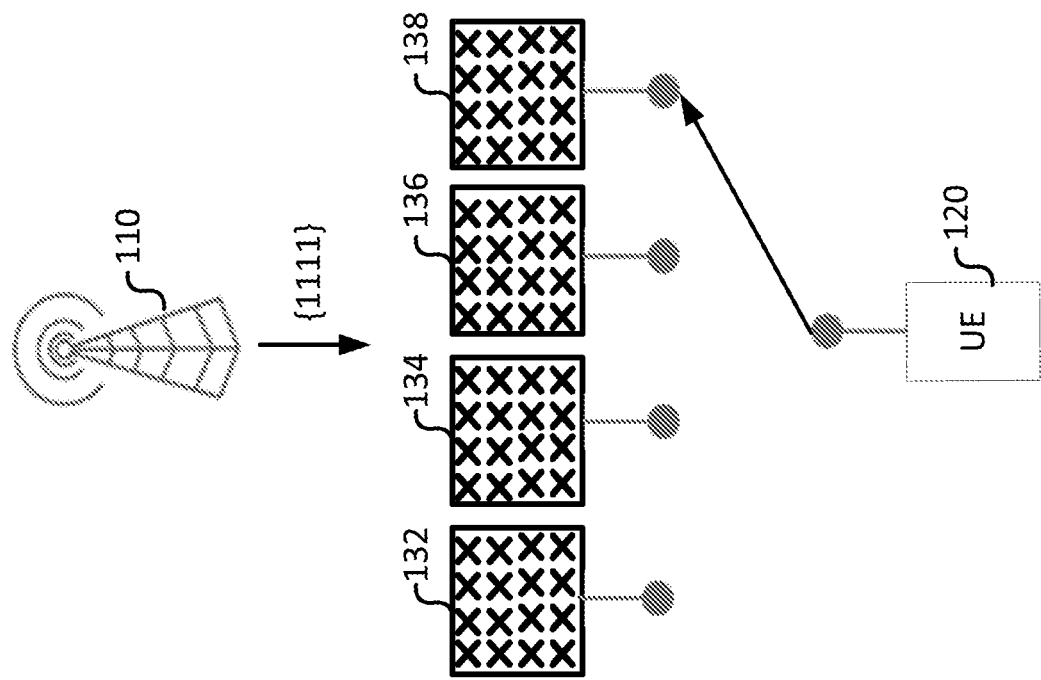

The following description contains specific information related to implementations of the present disclosure. The drawings and their accompanying detailed description are merely directed to implementations.

However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be different in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the present disclosure. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

In one implementation, a UE may be equipped with multiple antenna panels to enable high frequency band communication via beamforming. An antenna panel may contain a group of antenna elements and may be an operational unit for controlling a spatial filter for transmission. In one implementation, the antennal panels in the UE may be indexed to facilitate signaling between the UE and a network (NW).

In one implementation, the UE may transmit, to a BS (e.g., a gNB), a UE capability message that includes at least one of the number of the antenna panels and the maximum number of the antenna panels that can be activated simultaneously. In one implementation, the UE may report to the BS a number X representing the number of the antenna panels. In one implementation, the UE may report a number Y representing the maximum number of antenna panels that can be activated at the same time, where X may be greater than or equal to Y. In one implementation, the UE may report a number Z representing the number of antenna panels used for transmission or reception, where Y may be greater than or equal to Z. Each of the Z panels may be connected to a transceiver chain. In one implementation, X may be a positive integer greater than 1. X, Y, Z are positive integers where X>1, Y 1, and Z 1. The UE capability message may include at least one of the numbers X, Y, and Z.

In one implementation, X and Y may be greater than 1 and Z may be equal to 1. In this case, multiple panels are implemented on the UE and multiple panels can be activated at the same time but only one panel can be used for transmission. Several implementations will be provided to achieve a panel switch operation that allows selecting one panel among the Y panels and enabling flexible scheduling decisions.

In one implementation, selection of the Y panels from the X panels may be based on UE implementation when only Y is signaled to the BS. As a result, the signaling for panel selection and the signaling for panel state update between the BS and the UE may be based on the Y UE panels.

FIG. 1 includes a diagram 100 illustrating multiple antenna panels and panel activation/deactivation according to an example implementation of the present disclosure. As illustrated in the left-hand side of FIG. 1, the BS 110 is aware of four UE panels 132, 134, 136 and 138 equipped at the UE 120. The symbol 'x' illustrated in each of the panels 132, 134, 136 and 138 may represent a cross-polarized antenna.

The BS 110 may provide configuration for individual panels, such as channel state information reference signal (CSI-RS) resources and sounding reference signal (SRS) resources. It should be noted that while the BS 110 provides configurations for up to four panels, how to map individual configurations to individual physical panels may depend on the UE implementation. Nevertheless, the UE 120 may not change the mapping for active panels once the mapping is performed. The mapping may be performed again when inactive panels are to be activated. The four active panels may be dynamically/semi-statically indicated for transmission and/or reception.

In the right-hand side of FIG. 1, panel #1 132 and panel #2 134 are to be deactivated. After their deactivation, the dynamic and/or semi-static indication may be limited to panel #3 136 and panel #4 138. In the following disclosure, the dynamic and/or semi-static indication of panel selection may also be referred to as fast panel switch or panel switch.

In one implementation, panel selection indicated by the BS 110 may use a bitmap. The bitmap may include one bit for each of the panels 132, 134, 136 and 138 to indicate an activation status of the panels. For example, in the left-hand side of FIG. 1, the BS 110 may transmit a message that includes a bitmap {1111} to the UE 120 to indicate that all the four panels 132, 134, 136 and 138 are to be activated. The UE 120 may use the panel #4 138 for transmission and reception. In the right-hand side of FIG. 1, the BS 110 may transmit another message that includes a bitmap {0011} to the UE 120 to indicate that panel #1 132 and panel #2 134 are to be deactivated, and thus panel #3 136 and panel #4 138 remain activated. The UE 120 may also use the panel #4 138 for transmission and reception after receiving the bitmap {0011} from the BS 110.

Case 1: Panel Switch Operation

Case 1-1: Panel Activation Request

In one implementation, the UE may receive, from the BS, a panel activation request that indicates at least one of the antenna panels to be activated, or remain activated if the indicated at least one antenna panel was already activated. The panel activation request may be a complete signaling or a delta signaling. For example, the panel activation request may be a bitmap that includes one bit for each UE panel to indicate an activation/deactivation status of each UE panel. One example panel activation request having a bitmap form may be {1010}, indicating the first and the third panels are to be activated, or remain activated if they were activated already. The panel activation request may also carry an index to indicate which UE panel(s) is/are to be activated. One example panel activation request having at least one index may be {#1, #3} indicating the first and the third panels are to be activated.

The panel activation request may be carried in a downlink control information (DCI) format or a medium access control (MAC) control element (CE). In one implementation, a subset of panels may be configured by radio resource control (RRC) signaling. A MAC CE may be then used for activating panels within the subset.

In one implementation, the UE may further send a confirmation message after receiving the panel activation request. The confirmation message may be subject to an activation latency of the panel. For example, the UE may send the confirmation message to the BS after the indicated panel(s) is already activated (or turned on) based on the panel activation request. The confirmation message may be subject to an activation latency, which may be specified or (pre-)configured. The confirmation message may be sent after a pre-specified operation. In one implementation, the confirmation message is sent after a hybrid automatic repeat request (HARQ) acknowledgement (ACK) feedback corresponding to a physical downlink control channel (PDCCH) or a physical downlink shared channel (PDSCH) associated with the panel activation request is sent. The transmission of the confirmation message may be further subject to a latency from the HARQ-ACK feedback. The latency may be specified or (pre-)configured. In one implementation, the confirmation message may be a panel state report that indicates an activation state of the antenna panels. The UE may transmit the panel state report in response to the panel activation request.

Figure 2:
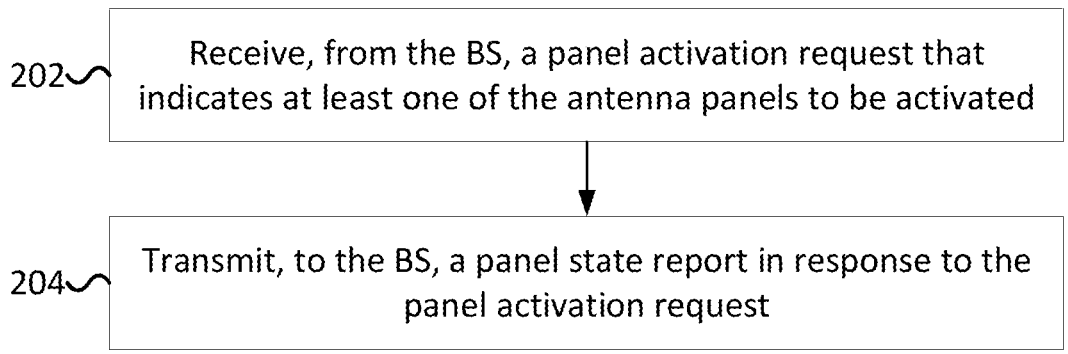
FIG. 2 is a flowchart of a method for panel activation according to an example implementation of the present disclosure.

FIG. 2 is a flowchart of a method 200 for panel activation according to an example implementation of the present disclosure. In action 202, the UE may receive, from the BS, a panel activation request that indicates at least one of the antenna panels to be activated. In action 204, the UE may transmit, to the BS, a panel state report in response to the panel activation request.

In one implementation, the panel state report may be carried in a MAC CE. The panel state report may use complete signaling or delta signaling. In one implementation, the panel state report may indicate whether each of the antenna panels is activated or deactivated, such as a bitmap including one bit for each panel. In another implementation, the panel state report may indicate which additional panel(s) is activated.

In one implementation, the confirmation message or the panel state report may be a MAC CE with a predefined logical channel identifier (LCID), format or identifier. The content of the MAC CE may contain information of currently activated panels as confirmation. The information carried by the MAC CE may be the panel index(s) of activated panel(s) or may be the number of the activated panels. The content of the MAC CE may be a fixed size of zero bits. The MAC CE may be a fixed size format or a variable size format. The content of the MAC CE may include an identifier of activated and/or deactivated panel(s). The content of the MAC CE may include a bitmap for indicating activated and/or deactivated panel(s). It should be noted that when the payload size of the MAC CE is zero bit, the LCID and optionally some reserved bits still exist. The MAC CE having a zero-bit payload may indicate that the UE simply follows the panel activation request without alternating it.

In one implementation, the UE may decide not to follow the panel activation request strictly. For example, the UE may decide to deactivate a panel that is indicated by the panel activation request. In this case, the confirmation message or the panel state report may also include information of the cause of UE's decision, such as "low UE battery."

Case 1-2: Panel Deactivation Request

In one implementation, the UE may receive, from the BS, a panel deactivation request that indicates at least one of the antenna panels to be deactivated, or remain deactivated if the indicated at least one antenna panel was already deactivated. The panel deactivation request may be a complete signaling or a delta signaling, similar to the implementations provided in Case 1-1. The panel deactivation request may be carried in a DCI format or a MAC CE. In one embodiment, the UE may further send a confirmation message after receiving the panel deactivation request. The confirmation message may be subject to a deactivation latency of the panel. For example, the UE may send the confirmation message to the BS after the indicated panel(s) is already deactivated (or turned off) based on the panel deactivation request. In one implementation, the confirmation message may be a panel state report that indicates an activation state of the antenna panels. The UE may transmit the panel state report in response to the panel deactivation request. Implementations of the confirmation message or the panel state report may be referred to those mentioned in Case 1-1. In one implementation, the panel activation request and the panel deactivation request may be implemented in a same message. For example, the same message includes a bitmap for indicating activated and/or deactivated panel(s) simultaneously.

Case 1-3: Panel Switch Indication

In one implementation, the UE may receive a panel switch indication from the BS. The panel switch indication may indicate which panel(s) is going to be used for transmission/reception by the UE. The panel switch indication may include a panel index or a mapped CSI-RS/SRS configuration ID. The BS may provide the panel switch indication via DCI/RRC/MAC CE explicitly or in an implicit way. Examples of the implicit way may include indication based on the traffic type, radio network temporary identifier (RNTI), or control resource set (CORESET).

Case 1-4: Panel State Report

A panel state report may indicate an activation state of the antenna panels, such as indicating whether each of the antenna panels is activated or deactivated. The panel state report sent from the UE may inform the BS which UE panels are active for panel switch operation. In one implementation, the panel state report may be used as a means for UE to request the BS for activating a different subset of UE panels.

In one implementation, the panel state report may be transmitted by the UE when the activation state changes. For example, the latest active panel index(s) (or the latest inactive panel index(s)) may be reported when there is a change in the activation state.

In one implementation, the UE may deactivate (turn off) a panel that is indicated as inactive in the panel state report after at least one of the following conditions is met:

(a) the UE receives a DCI format indicating to flush a buffer of a HARQ process that was used for transmission of the panel state report. For example, the UE receives a DCI format that indicates a toggled new data indicator (NDI) value and a HARQ process ID associated with the transmission of the panel state report.

(b) the UE receives a confirmation message (e.g., a MAC CE with a predefined LCID/format/identifier) from the BS in response to the panel state report. The content of the MAC-CE may contain information of currently activated panels as confirmation. The information may be panel index(s) of activated panel or may be a count on the active panels.

The panel state report may be transmitted periodically, aperiodically, semi-persistently, or event-triggered. In one implementation, the UE may receive, from the BS, a configuration that indicates a periodic transmission of the panel state report. In this case, the report may be initiated by the UE according to the reporting configuration. In one implementation, the UE may receive, from the BS, an activation that indicates a semi-persistent transmission of the panel state report. In one implementation, the UE may receive, from the BS, a request for the panel state report. In this case, the report may be queried by the BS via a panel state report request message, which may provide corresponding reporting resources. In one implementation, the panel state report may be transmitted after/during a beam failure recovery procedure.

It should be noted that for panel related signaling mentioned above, a panel index may be used. Association between the index and a corresponding configuration may not be changed before the corresponding panel is deactivated and/or the corresponding RRC configuration has been removed. The panel index may be an explicit ID or an implicit ID that is associated with other ID, such as synchronization signal block (SSB) ID, CSI-RS resource ID, CSI-RS resource set ID, SRS resource ID, SRS resource set ID, Transmission Configuration Indication (TCI) state, etc. The TCI state may correspond to DL direction or UL direction.

Case 2: Panel Timer

Figure 3:
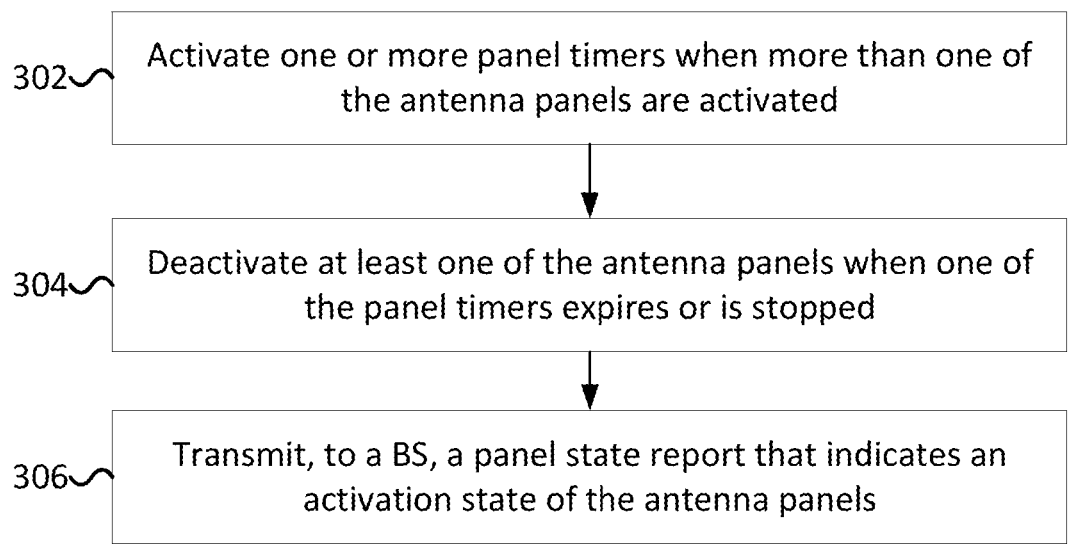
FIG. 3 is a flowchart of a method for panel timer control according to an example implementation of the present disclosure.

In one implementation, a panel timer may be configured for each active panel. In one implementation, a panel timer may be configured for multiple active panels. FIG. 3 is a flowchart of a method 300 for panel timer control according to an example implementation of the present disclosure. In action 302, the UE may activate one or more panel timers when more than one of the antenna panels are activated. In action 304, the UE may deactivate at least one of the antenna panels when one of the panel timers expires or is stopped. In action 306, the UE may transmit, to a BS, a panel state report that indicates an activation state of the antenna panels.

In one implementation, each of the panel timers may be associated with one antennal panel or multiple antenna panels. An antenna panel may be deactivated when its associated panel timer expires or is stopped. In one implementation, the UE may also activate a panel timer when one of the antenna panels is activated in action 302.

In one implementation, the UE may transmit the panel state report when one of the panel timers expires or is stopped. In one implementation, a power headroom report may be triggered when one of the panel timers expires or is stopped.

Case 2-1: Starting or Re-Starting the Panel Timer

The panel timer may be started or re-started when at least one of the following conditions is met:
 (a) when an antenna panel corresponding to the panel timer is activated by either the BS or the UE;
 (b) when a transmission or a reception takes place from an antenna panel corresponding to the panel timer, such as receiving a DL/UL scheduling on a PDCCH or a PDSCH, or transmitting a physical uplink control channel (PUCCH) or physical uplink shared channel (PUSCH);
 (c) when a random access channel (RACH) procedure is completed from one of the antenna panels;
 (d) when a beam failure recovery (BFR) procedure is completed from one of the antenna panels, such as receiving a response from the BS for beam failure recovery request transmission; and
 (e) when a panel is indicated as active in the panel state report and/or a corresponding confirmation message is received from the BS.

It should be noted the above conditions (c) and (d) may be applied to (1) the panel that performs the RACH procedure or the BFR procedure or (2) all active panels of the concerned serving cell. That is, if the RACH or BFR procedure is completed from one of the antenna panels, in one implementation the panel timer associated with the antenna panel may be started, while in another implementation all panel timers associated with all active panels of the concerned serving cell may be started.

Case 2-2: Stopping the Panel Timer

The panel timer may be stopped (or suspended) when at least one of the following conditions is met:
 (a) when an antenna panel corresponding to the panel timer is deactivated by either the BS or the UE;
 (b) when a RACH procedure is initiated;
 (c) when a beam failure is detected;
 (d) when the UE switches to an initial bandwidth part (BWP), such as when a BWP inactivity timer expires; and
 (e) when the UE goes to an idle state or an inactive state.

In one implementation, after the panel timer is suspended, the panel timer may be resumed when the RACH procedure is completed.

In one implementation, the panel timer may be stopped or re-started depending on different discontinuous reception (DRX) states.

Case 2-3: Fallback Panel

In one implementation, among all the antenna panels of the UE, there may be a fallback panel. The above-mentioned timer mechanism may not be applicable to the fallback panel. The fallback panel may keep activated. That is, in one implementation the UE does not turn off the fallback panel. In one implementation, there may be no panel timer associated with the fallback panel.

Figures 4, 5, 6:
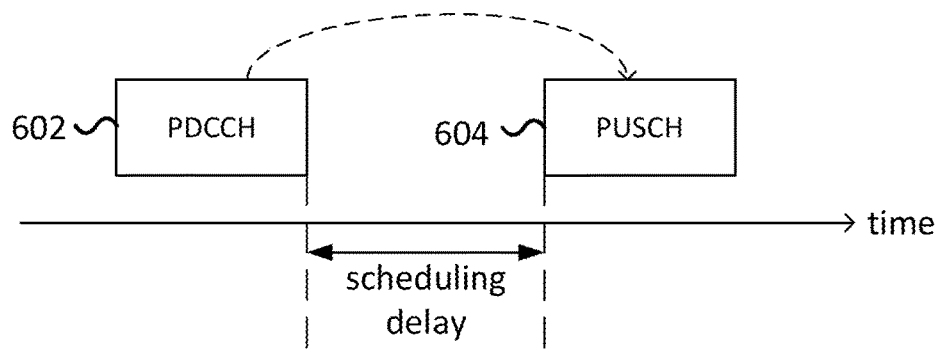
FIG. 4 is a flowchart of a method for antenna panel control with respect to a fallback panel according to an example implementation of the present disclosure.
FIG. 5 is a flowchart of a method for handling panel state misalignment according to an example implementation of the present disclosure.
FIG. 6 includes a diagram illustrating a scheduling delay according to an example implementation of the present disclosure.

FIG. 4 is a flowchart of a method 400 for antenna panel control with respect to a fallback panel according to an example implementation of the present disclosure. In action 402, the UE may select one of the antenna panels as a fallback panel. In one implementation, the UE may select the fallback panel based on a configuration from the BS. That is, the fallback panel may be (pre-)configured by the BS. For example, the configuration may indicate a specific panel or a specific panel index as the fallback panel. In one implementation, the BS or the UE may statically designate one panel as the fallback panel, such as panel #0. In one implementation, the BS or the UE may assign one of the currently activated panels as the fallback panel, such as the panel having the smallest index among the activated panels. In action 404, the UE may activate the fallback panel and deactivate all the other antenna panels. In one implementation, the fallback panel may be a default panel that is always active.

In one implementation, parameters related to timer configurations for all configured panels may be the same. There may be only one set of timer configuration applicable to all configured panels.

Case 3: Panel State Misalignment Between BS and UE

Based on the implementation of signaling mechanism for the activation state of the antenna panels, e.g., which panels are active and which panels are inactive, there may be occasions that the BS and the UE have different understanding about the activation state of the antenna panels. Such situation may be referred to as panel state misalignment between the BS and the UE. When there is panel state misalignment, the BS may indicate to the UE a panel for transmission/reception but the indicated panel is currently not active. For example, the UE may receive, from the BS, a panel switch indication that indicates an inactive antenna panel for transmission by the UE. The panel state misalignment occasions may include:
  (a) Semi-persistent (SP) or aperiodic (AP) SRS transmission whose spatial relation is associated with an inactive panel;
  (b) PUCCH transmission whose active spatial relation is associated with an inactive panel; and
  (c) PUSCH transmission whose indicated spatial relation reference is associated with an inactive panel. The spatial relation reference may be determined by uplink control information (UCI) or a default behavior when an SRS resource indicator (SRI) field is not present in the UCI. It is noted that the spatial relation reference is provided by an RRC parameter spatialRelationInfo for different signal/channels in NR Rel-15/16. The spatial relation reference may be provided by another approach, e.g., an UL TCI framework similar to a DL TCI framework, but same information is delivered.

Several implementations are provided below for dealing with the panel state misalignment. It should be noted that the UE may adopt one or a combination of the following implementations. Different implementations may be applicable to different occasions.

Case 3-1: UE Ignores the Indicated Transmission Occasion

The UE may drop a transmission occasion indicated by the panel switch indication that indicates an inactive panel for transmission. Case 3-1 may be applicable to, but not limited to, the occasion (a) (SP/AP SRS transmission).

Case 3-2: UE Selects a Panel from Active Ones for Transmission

Case 3-2 may be applicable to, but not limited to, the occasion (b) (PUCCH transmission) and/or the occasion (c) (PUSCH transmission).

The UE may perform a measurement or rely on a previous measurement result to select a panel among the activated panels. In one implementation, the UE may select a panel that has a measured metric better than a threshold, which may be a predefined or (pre-)configured value. The measured metric may be Layer 1 Signal to Interference plus Noise Ratio (L1-SINR), Layer 1 Reference Signal Received Power (L1-RSRP), Layer 1 Received Signal Strength Indicator (L1-RSSI), Block Error Rate (BLER), etc. In one implementation, the UE may ignore the indicated transmission if the measured metrics of all the activated panels are worse than the threshold.

Case 3-3: UE Triggers a Panel State Report to BS

The UE may transmit the panel state report after receiving the panel switch indication that indicates an inactive panel for transmission. Implementations on the panel state report may be referred to in Case 1. FIG. 5 is a flowchart of a method 500 for handling panel state misalignment according to an example implementation of the present disclosure. In action 502, the UE receives, from a BS, a panel switch indication that indicates an inactive panel for transmission. In action 504, the UE transmits, to the BS, a panel state report after receiving the panel switch indication. FIG. 5 illustrates an implementation of an event-triggered panel state report.

In one implementation, the UE may fallback to one-panel operation. For example, the UE may leave only one active panel (e.g., the fallback panel mentioned in Case 2-3) and turn off the others. That is, the UE may keep the fallback panel active or activate the fallback panel, and deactivate all the other antenna panels. The one active panel may be up to UE selection or may be configured. For example, the one active panel maybe the panel without timer configuration. In one implementation, the fallback behavior (e.g., only one panel is activated) may last until a confirmation message in response to the panel state report is received by the UE.

In one implementation, the UE may fallback to all-panel operation. For example, the UE may turn on all panels and apply corresponding resource mapping if configured. It should be noted that the all-panel operation may be subject to a UE capability constraint. For example, the all-panel operation may mean that all the Y panels are used, where the parameter Y is the maximum number of antenna panels that can be activated at the same time.

Case 3-4: UE Triggers a Beam Failure Recovery Procedure

The UE may trigger a beam failure recovery procedure when there is panel state misalignment assuming the beam failure detection criteria is fulfilled.

Case 3-5: UE Activates the Indicated Inactive Panel for Transmission, if a Scheduling Delay is Larger than a Panel Activation Latency The UE may activate the inactive antenna panel indicated by the panel switch indication after determining that a scheduling delay for a PUSCH transmission is longer than a panel activation latency for activating the inactive antenna panel. FIG. 6 includes a diagram 600 illustrating a scheduling delay according to an example implementation of the present disclosure. The BS transmits to the UE a PDCCH 602 carrying a panel switch indication that indicates an inactive panel for transmission. The PDCCH 602 schedules a PUSCH 604 transmission via a currently inactive panel. The scheduling delay may be the duration between the PDCCH 602 and the PUSCH 604.

The panel activation latency may be the time the UE takes to activate an inactive panel. If the scheduling delay is longer than the activation latency, the UE may activate the inactive panel indicated in the PDCCH 602 for transmitting the PUSCH 604. The beam indicated in the PDCCH 602 may be used for transmitting the PUSCH 604. A panel state report may be further transmitted due to the change of the panel activation state. On the other hand, if the scheduling delay is shorter than the activation latency, the UE may not be able to turn on the inactive panel when the PUSCH 604 starts. The beam indicated in the PDCCH 602 may not be used for transmitting the PUSCH 604. In this case, the UE may adopt behaviors described in Cases 3-1 through 3-4.

In one implementation, the physical panel to be activated may be the latest one that was associated with the indicated panel index. In one implementation, the physical panel to be activated may be up to UE implementation.

It should be noted that implementations described in Cases 3-1 through 3-5 may be logically combined.

In one implementation, the UE may receive AP SRS transmission whose spatial relationship is not associated with an active panel. In this case, the UE may ignore the transmission (Case 3-1) and trigger a panel state report to the BS (Case 3-3).

In one implementation, the UE may receive an UL grant for PUSCH transmission whose spatial relationship is not associated with an active panel. In this case, the UE may transmit the PUSCH with another UE panel that is currently active (Case 3-2) and trigger a panel state report to the BS (Case 3-3). The "another UE panel that is currently active" may be up to UE selection.

In one implementation, the UE may receive a SP/AP SRS activation MAC CE containing spatial relationship not referring to an active panel. The UE may activate an inactive panel and use the newly active panel for SP/AP SRS transmission (Case 3-5). The "newly active panel" may be the latest one that was associated with the indicated panel index or may be up to UE selection. The UE may further trigger a panel state report to the BS (Case 3-3), where the active panel information in the panel state report may include the "newly active panel".

Figure 7:
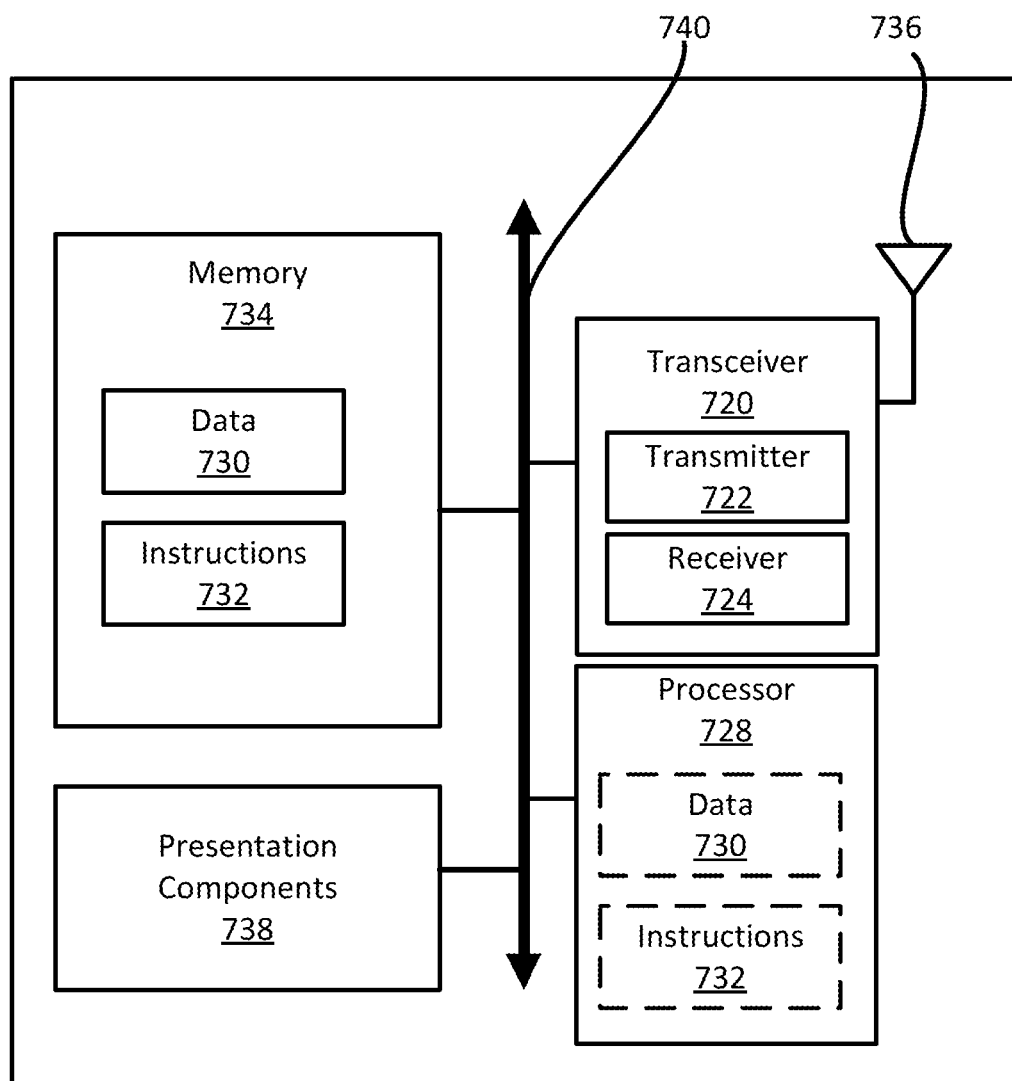
FIG. 7 is a block diagram illustrating a node for wireless communication in accordance with various aspects of the present disclosure.

FIG. 7 is a block diagram illustrating a node 700 for wireless communication according to the present disclosure. As illustrated in FIG. 7, the node 700 may include a transceiver 720, a processor 728, a memory 734, one or more presentation components 738, and at least one antenna 736. The node 700 may also include an RF spectrum band module, a BS communications module, a network communications module, and a system communications management module, Input/Output (I/O) ports, I/O components, and a power supply (not shown).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof.

Example memory includes solid-state memory, hard drives, optical-disc drives, etc. As illustrated in FIG. 7, the memory 734 may store computer-readable, computer-executable instructions 732 (e.g., software codes) that are configured to cause the processor 728 to perform various disclosed functions with reference to FIGS. 1 through 6. Alternatively, the instructions 732 may not be directly executable by the processor 728 but be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory.

The processor 728 may process the data 730 and the instructions 732 received from the memory 734, and information transmitted and received via the transceiver 720, the base band communications module, and/or the network communications module. The processor 728 may also process information to be sent to the transceiver 720 for transmission via the antenna 736 to the network communications module for transmission to a core network.

One or more presentation components 738 present data to a person or another device. Examples of presentation components 738 include a display device, a speaker, a printing component, and a vibrating component.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for wireless communication performed by a user equipment (UE), the UE comprising a plurality of antenna panels, the method comprising:
transmitting, to a Base Station (BS), a UE capability message that includes a number of the plurality of antenna panels and a maximum number of the plurality of antenna panels that are activatable; and
transmitting, to the BS, a panel report that includes information of the plurality of antenna panels, the information associated with at least one of a Synchronization Signal Block (SSB) and a Channel State Information Reference Signal (CSI-RS).

2. The method of claim 1, wherein the panel report further includes an identifier (ID) of each of the plurality of antenna panels.

3. The method of claim 1, wherein the panel report further includes an activation state of the plurality of antenna panels, the activation state indicating whether each of the plurality of antenna panels is activated or deactivated.

4. The method of claim 3, wherein transmitting, to the BS, the panel report comprises transmitting, to the BS, the panel report when the activation state changes.

5. The method of claim 1, wherein the UE capability message further includes an activation latency of the plurality of antenna panels.

6. The method of claim 1, wherein transmitting, to the BS, the panel report comprises transmitting, to the BS, the panel report periodically after the UE receives, from the BS, a configuration that indicates a periodic transmission of the panel report.

7. The method of claim 1, wherein transmitting, to the BS, the panel report comprises transmitting, to the BS, the panel report in response to receiving a request for the panel report from the BS.

8. The method of claim 1, wherein transmitting, to the BS, the panel report comprises transmitting, to the BS, the panel report semi-persistently after the UE receives, from the BS, a configuration that indicates a semi-persistent transmission of the panel report.

9. The method of claim 1, further comprising:
activating or deactivating each of the plurality of antenna panels based on UE implementation.

10. A user equipment (UE) for wireless communication, the UE comprising:
one or more processors; and
at least one memory coupled to at least one of the one or more processors, wherein the at least one memory stores one or more computer-executable instructions that, when executed by the at least one of the one or more processors, cause the UE to:
transmit, to a Base Station (BS), a UE capability message that includes a number of a plurality of antenna panels of the UE and a maximum number of the plurality of antenna panels that are activatable; and
transmit, to the BS, a panel report that includes information of the plurality of antenna panels, the information associated with at least one of a Synchronization Signal Block (SSB) and a Channel State Information Reference Signal (CSI-RS).

11. The UE of claim 10, wherein the panel report further includes an identifier (ID) of each of the plurality of antenna panels.

12. The UE of claim 10, wherein the panel report further includes an activation state of the plurality of antenna panels, the activation state indicating whether each of the plurality of antenna panels is activated or deactivated.

13. The UE of claim 12, wherein transmitting, to the BS, the panel report comprises transmitting, to the BS, the panel report when the activation state changes.

14. The UE of claim 10, wherein the UE capability message further includes an activation latency of the plurality of antenna panels.

15. The UE of claim 10, wherein transmitting, to the BS, the panel report comprises transmitting, to the BS, the panel report periodically after the UE receives, from the BS, a configuration that indicates a periodic transmission of the panel report.

16. The UE of claim 10, wherein transmitting, to the BS, the panel report comprises transmitting, to the BS, the panel report in response to receiving a request for the panel report from the BS.

17. The UE of claim 10, wherein transmitting, to the BS, the panel report comprises transmitting, to the BS, the panel report semi-persistently after the UE receives, from the BS, a configuration that indicates a semi-persistent transmission of the panel report.

18. The UE of claim 10, wherein the one or more computer-executable instructions, when executed by the at least one of the one or more processors, further cause the UE to:
activate or deactivate each of the plurality of antenna panels based on UE implementation.

* * * * *